US011765577B2

(12) United States Patent
Liu et al.

(10) Patent No.: US 11,765,577 B2
(45) Date of Patent: Sep. 19, 2023

(54) IDENTITY OBSCURATION FOR A WIRELESS STATION

(71) Applicant: Apple Inc., Cupertino, CA (US)

(72) Inventors: Yong Liu, Campbell, CA (US); Christiaan A. Hartman, San Jose, CA (US); Tianyu Wu, Cupertino, CA (US); Qi Wang, Sunnyvale, CA (US); Jarkko L. Kneckt, Los Gatos, CA (US); Jinjing Jiang, San Jose, CA (US); Su Khiong Yong, Palo Alto, CA (US); Guoqing Li, Campbell, CA (US)

(73) Assignee: Apple Inc., Cupertino, CA (US)

(*) Notice: Subject to any disclaimer, the term of this patent is extended or adjusted under 35 U.S.C. 154(b) by 492 days.

(21) Appl. No.: 16/887,952

(22) Filed: May 29, 2020

(65) Prior Publication Data
US 2021/0014679 A1  Jan. 14, 2021

Related U.S. Application Data

(60) Provisional application No. 62/873,659, filed on Jul. 12, 2019.

(51) Int. Cl.
*H04W 12/02* (2009.01)
*H04W 12/037* (2021.01)

(52) U.S. Cl.
CPC ........ *H04W 12/02* (2013.01); *H04W 12/037* (2021.01)

(58) Field of Classification Search
CPC ... H04W 12/02; H04W 12/037; H04W 12/03; H04W 12/50; H04W 12/71; H04W 12/75; H04L 61/2539; H04L 2101/622
See application file for complete search history.

(56) References Cited

U.S. PATENT DOCUMENTS

2005/0266826 A1* 12/2005 Vlad .................... H04L 63/101
455/410
2012/0257753 A1* 10/2012 Ochikubo ............. H04W 12/02
380/270

(Continued)

OTHER PUBLICATIONS

Heikkinen, S., "Establishing a Secure Peer Identity Association Using IMS Architecture", Jun. 2008, The Third International Conference on Internet Monitoring and Protection, pp. 145-151 (Year: 2008).*

*Primary Examiner* — Kenneth W Chang
(74) *Attorney, Agent, or Firm* — Sterne, Kessler, Goldstein & Fox P.L.L.C.

(57) ABSTRACT

Disclosed herein are system, method, and computer program product embodiments for identity obscuration of a station (STA) connected to a wireless network to prevent the tracking of the STA. Embodiments include a STA configured to establish a security association with an access point (AP) based on an original long term identity for the station and an identity of the AP. The STA can transmit a new long term identity for the STA to the AP based on the security association. The STA can then transmit a request frame to change the original short term identity assigned to the STA to the AP. The STA can receive a response frame from the AP. The response frame can include a new short term identity assigned to the station by the AP. The STA can then map its new long term identity to its new short term identity assigned by the AP.

20 Claims, 9 Drawing Sheets

(56) References Cited

U.S. PATENT DOCUMENTS

| | | | | |
|---|---|---|---|---|
| 2013/0128808 A1* | 5/2013 | Wentink | ............... | H04L 1/165 |
| | | | | 370/328 |
| 2014/0334287 A1* | 11/2014 | Chen | ............... | H04W 24/04 |
| | | | | 370/216 |
| 2016/0316362 A1* | 10/2016 | Ding | ............... | H04W 64/00 |
| 2017/0012977 A1* | 1/2017 | Li | ............... | H04L 63/06 |
| 2017/0013449 A1* | 1/2017 | Raman | ............... | H04W 12/06 |

\* cited by examiner

| AID | 0 | 1 | 2 | 3 | ... | n | n+1 | n+2 | ... | n+m | n+m+1 | ... | 2007 |
|---|---|---|---|---|---|---|---|---|---|---|---|---|---|
| TIM Bitmap | 0 | 0 | 0 | 0 | ... | 1 | 0 | 1 | ... | 1 | 0 | ... | 0 |

704 → AID
702 → TIM Bitmap

Partial Virtual Bitmap 706 (spans from n to n+m)

FIG. 7

IDENTITY OBSCURATION FOR A WIRELESS STATION

CROSS-REFERENCE TO RELATED APPLICATION

The present application claims the benefit of provisional U.S. Patent Application No. 62/873,659, titled "Identity Obscuration for a Wireless Station" and filed on Jul. 12, 2019, which is incorporated herein by reference in its entirety.

BACKGROUND

Technical Filed

This disclosure relates to the field of wireless communications, including identity obscuration of a station (STA) connected to a wireless network to prevent the tracking of the STA.

Background

Wireless networking has fundamentally changed where users use their electronic devices. Instead of using their electronic devices merely at their home or office, users now use their electronic devices to connect to wireless networks provided at various other places such as coffee shops, departments stores, and airports. Users connect to these wireless networks using various wireless communication standards. For example, users often connect to wireless networks using the Institute of Electrical and Electronics Engineers (IEEE) 802.11 standard (current proposals and/or future versions). To manage an electronic device's association with a wireless network, wireless communication standards such as IEEE 802.11 often use the electronic device's long term identity (e.g., the electronic device's media access control (MAC) address). This often requires the electronic device to include its long term identity in the frames it transmits.

But these wireless communication standards often include the long term identity of the electronic device unencrypted in transmitted frames. Moreover, these wireless communication standards often prevent the electronic device from changing its long term identity after the electronic device has already connected to the wireless network. This can create privacy concerns in certain environments. For example, the electronic device can be easily tracked via its long term identity using a network sniffer that intercepts traffic passing over the wireless network.

SUMMARY

According to some embodiments, a mapping between a short term identity for a station (STA) and a long term identity for the STA can be used to enable identity obscuration of the STA to prevent tracking of the STA while it is connected to a wireless network. In some embodiments, the wireless network may use the Institute of Electrical and Electronics Engineers (IEEE) 802.11 standard (current proposals and/or future versions) or various other wireless communication protocols.

In some embodiments, a STA can establish a security association with an access point (AP) and obtain a short term identity from the AP. The short term identity can be an association identifier (AID) assigned to the STA by the AP when the STA first established the security association with the AP. The STA can generate a new long term identity for itself and then transmit the new long term identity to the AP. The new long term identity can be a media access control (MAC) address. The STA can transmit the new long term identity by leveraging the security association with the AP. For example, the STA can encrypt the new long term identity using a set of cryptographic keys installed by the security association. Both the AP and the STA can map the STA's new long term identity to its short term identity assigned by the AP; therefore, the STA only needs to include its short term identity in the transmitted frames to the AP. At a later time, the STA can transmit a request frame to the AP to change the short term identity assigned to itself by the AP. The STA can then receive a response frame from the AP. The response frame can include a new short term identity assigned to the STA by the AP. The new short term identity can be a new AID assigned to the STA by the AP. The request and response frames can be encrypted to avoid being tracked by other devices. Both the AP and the STA can then map its new long term identity to its new short term identity assigned by the AP, and the STA can include its new short term identity in the transmitted frames to the AP. Thereafter, the STA can periodically change its short term identity to prevent tracking of the STA. The STA can further maintain its association with the AP using its new long term identity, without being tracked, as far as the new long term identity is never transmitted over the wireless network in the clear.

In some embodiments, a STA can periodically change or mask various "fingerprint" fields stored in frames transmitted over a wireless network to prevent tracking of the STA while it is connected to the wireless network. For example, the STA can reset a sequence control (SC) field in a frame to a random value whenever the STA has its short term identity changed. The STA can reset a packet number (PN) of a Counter Mode Cipher Block Chaining Message Authentication Code Protocol (CCMP) field in a frame to a random value whenever the STA has its short term identity changed. The STA can mask a high throughput control (HTC) field and or a CCMP field in a frame. The STA can also encrypt one or more MAC header fields of a frame together with the MAC payload.

In some embodiments, an AP can establish a security association with a STA and assign a short-term identity to the STA. The short term identity can be an AID assigned to the STA by the AP when the STA first established the security association with the AP. The AP can then receive a new long term identity from the STA. The new long term identity can be a MAC address. The AP can receive the new long term identity based on the security association. For example, the STA can transmit the new long term identity in encrypted form to the AP using a set of cryptographic keys installed by the security association. Both the AP and the STA can map the STA's new long term identity to its short term identity assigned by the AP; therefore, the AP only needs to include the STA's short term identity in the transmitted frames to the STA. The AP can then receive a request frame from the STA to change the short term identity assigned to the STA by the AP. The AP can then transmit a response frame to the STA. The response frame can include a new short term identity assigned to the station. The request and response frames can be encrypted to avoid being tracked by other devices. The new short term identity can be a new AID assigned to the STA by the AP. The AP can select the new AID randomly from within a block of AIDs that is randomly selected when a new AID change period starts. Both the AP and the STA can map the new long term identity for the STA to the new short term identity assigned to the STA, and the AP can include the STA's new short term identity in the transmitted frames to the STA. Thereafter, the AP can periodically change the STA's short term identity to prevent tracking of the STA. The AP can also maintain an association with the STA using the new long term identity of the STA without the new long term identity being transmitted over the wireless network in the clear.

Other features of the present disclosure will be apparent from the accompanying drawings and from the detailed description.

BRIEF DESCRIPTION OF THE DRAWINGS

The accompanying drawings are incorporated herein and form a part of the specification.

FIG. 7 is a block diagram of an example traffic information map (TIM) bitmap of a TIM field that is represented using a partial virtual bitmap, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
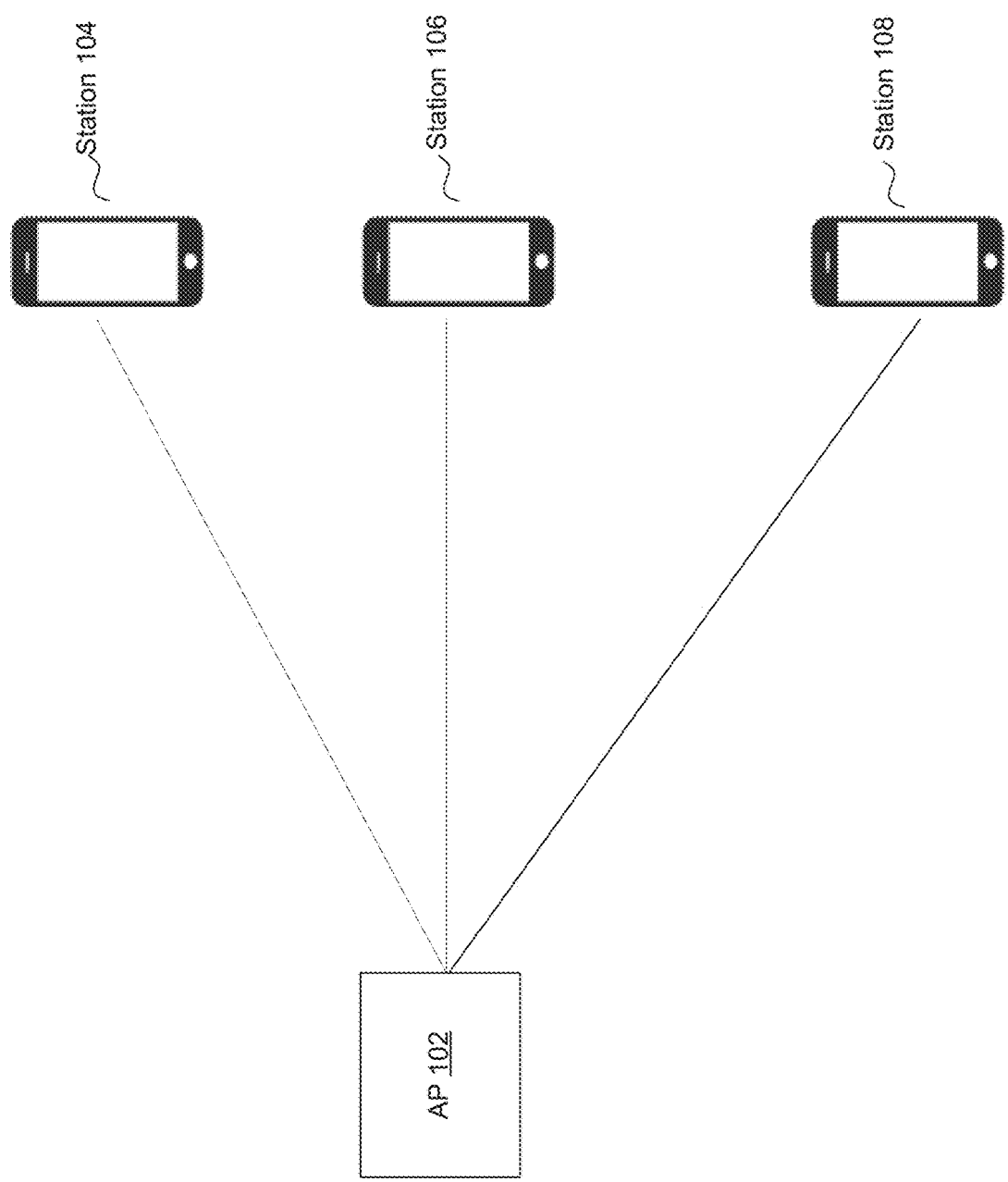
FIG. 1 illustrates an example system for identity obscuration of a station (STA) connected to a wireless network, according to some embodiments.

Provided herein are system, apparatus, device, method and/or computer program product embodiments, and/or combinations and sub-combinations thereof, for identity obscuration of a station (STA) connected to a wireless network to prevent the tracking of the STA. Some embodiments operate by a STA establishing a mapping between a short term identity for the STA (e.g., an AID) that is transmitted over a wireless network "in the clear" and periodically changed, and a long term identity for the STA (e.g., a media access control (MAC) address) that remains constant while the STA is associated with an access point (AP) and which is never transmitted over the wireless network "in the clear." In addition, some embodiments operate by a STA periodically changing or masking various "fingerprint" fields stored in frames transmitted over a wireless network.

Users often use their electronic devices (e.g., mobile phones, laptops, smart watches, and various other electronic devices as would be appreciated by a person of ordinary skill in the art) to connect to wireless networks provided at public places such as coffee shops, departments stores, and airports. Users connect to these wireless networks using various wireless communication standards. For example, users often connect to wireless networks using the Institute of Electrical and Electronics Engineers (IEEE) 802.11 standard (current proposals and/or future versions). To manage an electronic device's association with a wireless network, wireless communication standards such as IEEE 802.11 often use the electronic device's long term identity (e.g., the electronic device's media access control (MAC) address). This often requires the electronic device to include its long term identity in the frames it transmits.

But these wireless communication standards often store the long term identity of the electronic device unencrypted in transmitted frames. Moreover, these wireless communication standards often prevent the electronic device from changing its long term identity after the electronic device has already connected to a wireless network. This can create privacy concerns in certain environments. Specifically, the electronic device can be easily tracked using a network sniffer that intercepts traffic passing over the wireless network. This is because the long term identity of the electronic device is stored in an unencrypted format and because it remains relatively constant. This is especially true in public places such as coffee shops, department stores, and airports.

For example, a customer may visit a department store and connect their mobile device to the department store's wireless network. However, once the customer connects to the store's wireless network, any network sniffer present in the store can track where in the store the customer is spending their time, how often they are visiting, and even what they're browsing on their mobile device.

Some wireless communication standards allow an electronic device to dynamically change its long term identity prior to connecting to a wireless network. This can reduce the likelihood that the electronic device can be tracked prior to joining the wireless network. But this still presents privacy concerns. This is because the electronic device often cannot change its long term identity once it joins a wireless network. Therefore, once the electronic device joins the wireless network, the electronic device can still be easily tracked so long as it is connected to the network. Thus, conventional approaches are unable to simultaneously manage an electronic device's association with a wireless network while hiding the identity of the electronic device.

Provided herein are systems and methods for solving this technological problem. Specifically, embodiments herein involve establishing a mapping between a short term identity for a STA (e.g., an AID) that is transmitted over a wireless network in the clear and periodically changed, and a long term identity for the STA (e.g., a MAC address) that remains constant while the STA is associated with an AP and which is never transmitted over the wireless network "in the clear." Herein, "in the clear" means transmitted unencrypted over the wireless network.

FIG. 1 illustrates an example system 100 for identity obscuration of a STA connected to a wireless network, according to some embodiments. System 100 includes AP 102 and STAs 104, 106, and 108. Together with AP 102, STAs 104, 106, and 108 form a basic service set (BSS) or an Extended Service Set (ESS). It is to be appreciated that system 100 may include other STAs in addition to or in place of the STAs illustrated in FIG. 1 without departing from the scope and spirit of this disclosure. These other STAs include, but are not limited to, a desktop computer, laptop, smartphone, tablet, touchpad, wearable electronic device, smart watch, or other electronic device.

STAs 104, 106, and 108 can transmit and receive frames through AP 102. For example, AP 102 and STAs 104, 106, and 108 can transmit and receive media access control protocol data unit (MPDU) frames according to the IEEE 802.11 standard (current proposals and/or future versions). As would be appreciated by a person of ordinary skill in the art, STAs 104, 106, and 108 can transmit and receive frames through AP 102 using various other wireless communication protocols.

Figure 2:
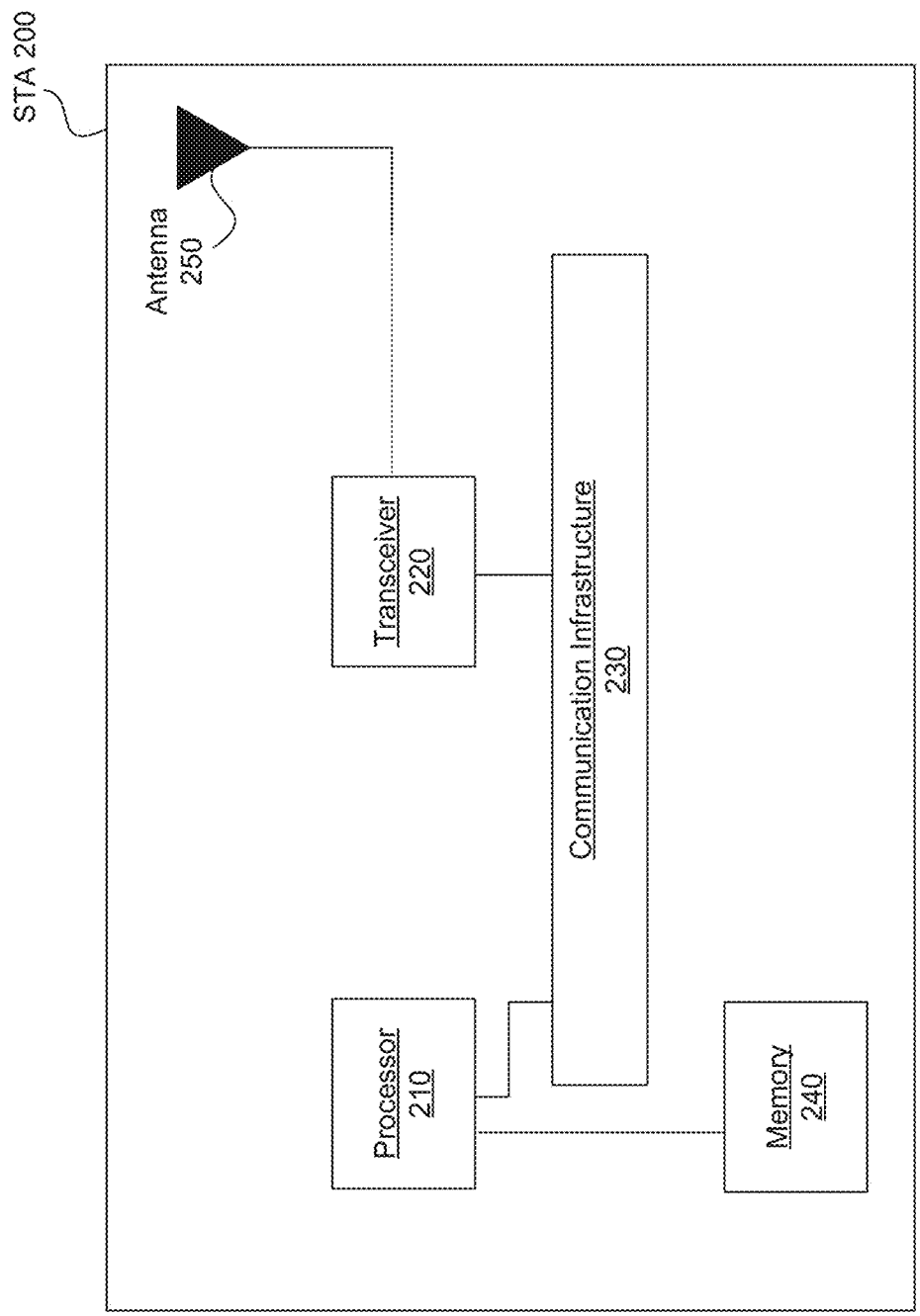
FIG. 2 is a block diagram of an example STA that transmits and receives frames over a wireless network, according to some embodiments.

FIG. 2 illustrates a block diagram of an example STA 200 that transmits and receives frames over a wireless network, according to some embodiments. STA 200 may be any of the STAs (e.g., 104, 106, or 108) of system 100. STA 200 includes processor 210, transceiver 220, communication infrastructure 230, memory 240, and antenna 250. Memory 240 may include random access memory (RAM) and/or cache, and may include control logic (e.g., computer software) and/or data. Processor 210 together with instructions stored in memory 240 (or hard-wired in processor 210) perform operations that protects an identity of STA 200 while generating various communications frames (data and/or control) that are transmitted using transceiver 220 over a wireless network. Transceiver 220 transmits and receives communications signals (e.g. wireless signals) via antenna 250, including communication frames that support protecting an identity of STA 200 while it is connected to a wireless network according to some embodiments. Communication infrastructure 230 may be a bus. Antenna 250 may include one or more antennas that may be the same or different types.

Figure 3:
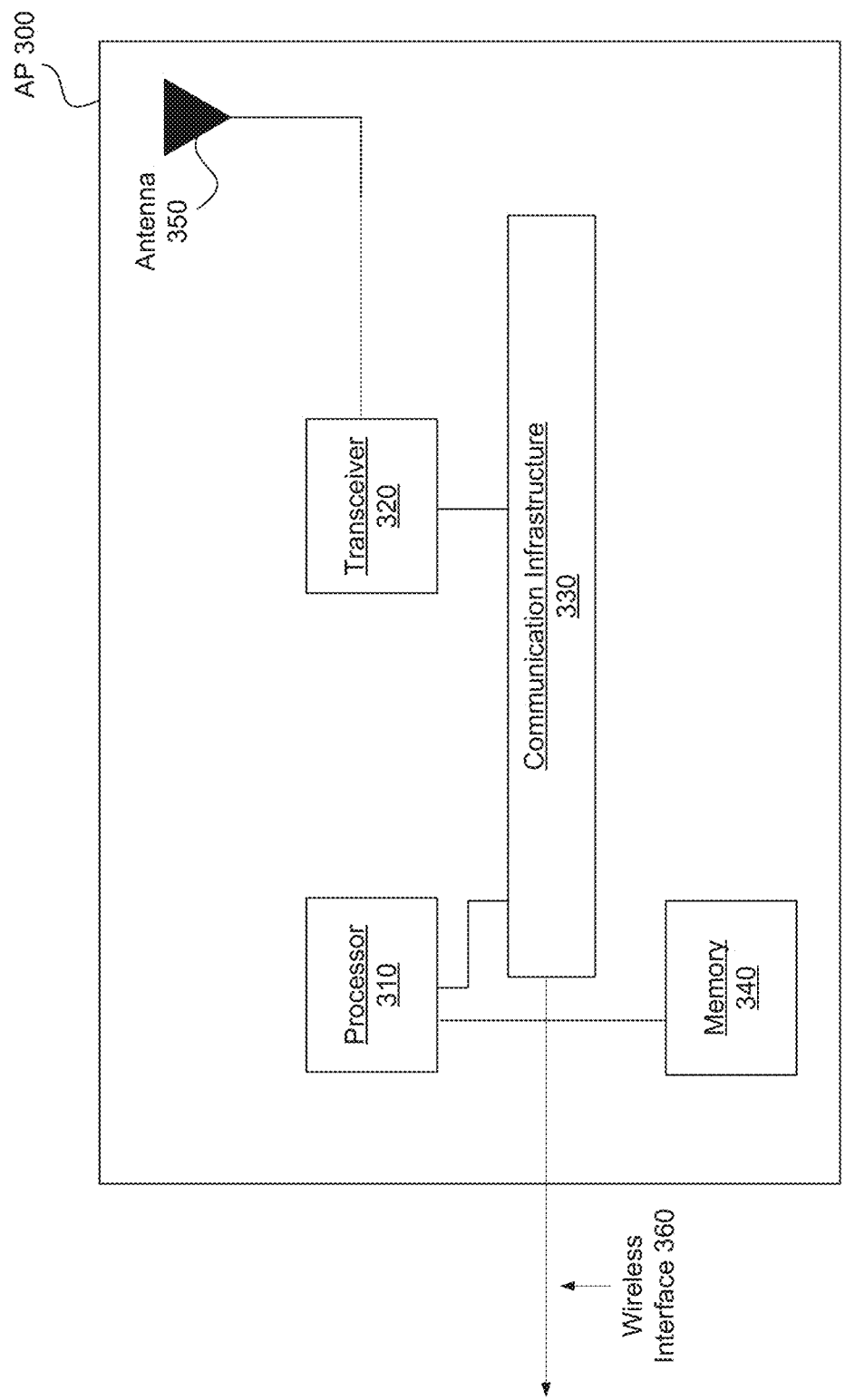
FIG. 3 illustrates a block diagram of an example access point (AP) that transmits and receives frames over a wireless network, according to some embodiments.

FIG. 3 illustrates a block diagram of an example AP 300 that transmits and receives frames over a wireless network, according to some embodiments. AP 300 may be AP 102 of system 100. AP 300 includes processor 310, transceiver 320, communication infrastructure 330, memory 340, antenna 350, and wireless interface 360. Memory 340 may include random access memory (RAM) and/or cache, and may include control logic (e.g., computer software) and/or data. Processor 310 together with instructions stored in memory 640, performs operations that protects an identity of a STA (e.g., any of STAs 104, 106, or 108) while it is connected to a wireless network. Transceiver 320 can transmit and receive communications signals including communication frames that support protecting an identity of a STA 200 over wireless interface 360, and may be coupled to antenna 350. Communication infrastructure 330 may be a bus. Antenna 350 may include one or more antennas that may be the same or different types.

Figure 4:
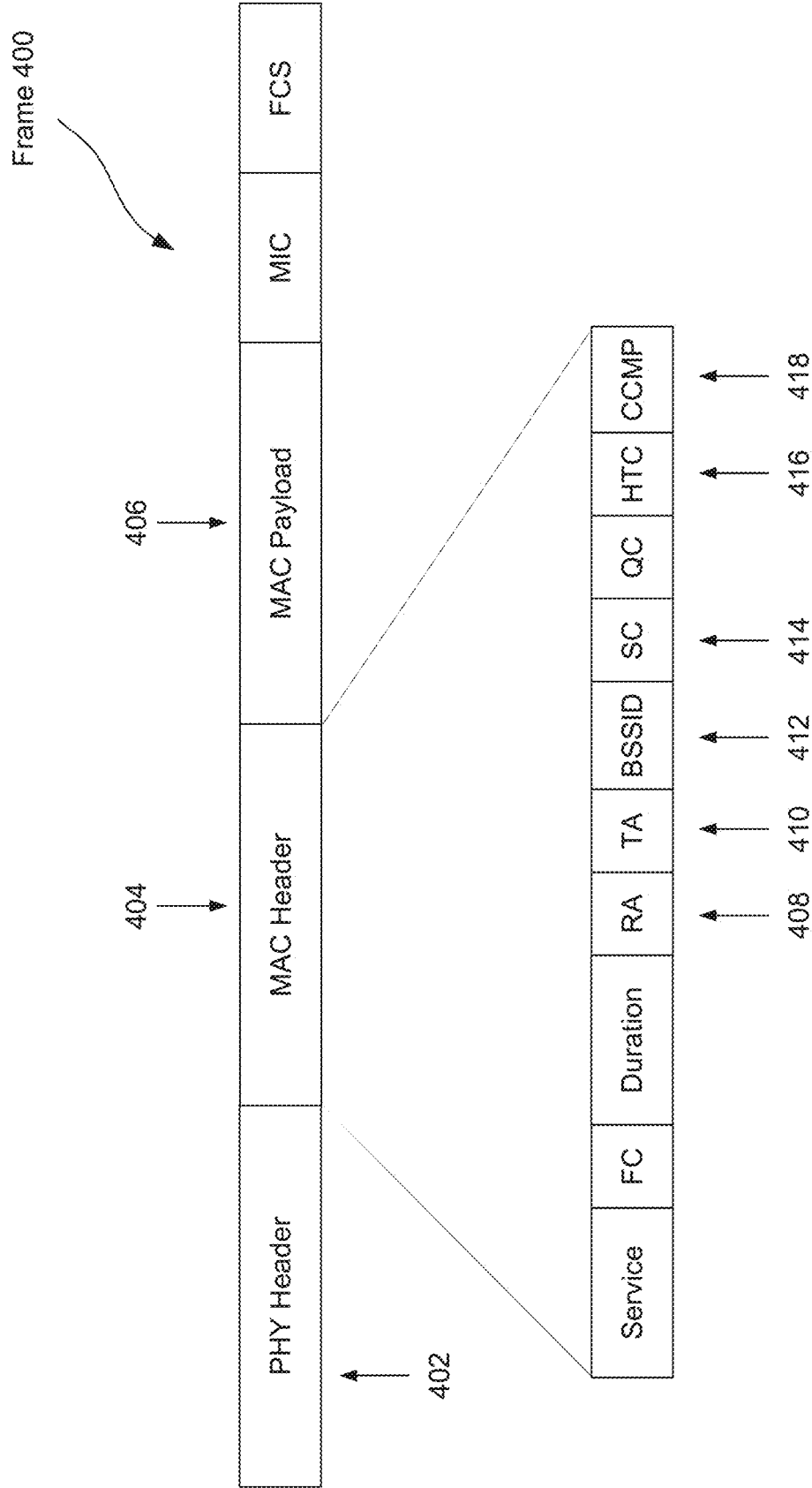
FIG. 4 is a block diagram of an example standard compliant frame according to the Institute of Electrical and Electronics Engineers (IEEE) 802.11 standard, according to some embodiments.

FIG. 4 is a block diagram of an example standard compliant frame 400 according to the IEEE 802.11 standard (current proposals and/or future versions), according to some embodiments. FIG. 4 is described with reference to FIG. 1, where STAs 104, 106, and 108 can transmit and receive frame 400 with AP 102.

Frame 400 can include a physical (PHY) header 402, a MAC header 404, and a MAC payload 406. Frame 400 can include various other fields as would be appreciated by a person of ordinary skill in the art. Frame 400 can be a data frame, a management frame, a control frame, or various other type of frame as would be appreciated by a person of ordinary skill in the art.

Frame 400 can include one or more identities for STAs (e.g., STAs 104, 106, and 108) and an AP (e.g., AP 102). For example, PHY header 402 can include an association identifier (AID) for a STA. An AID can also be referred to as a short term identity for a STA. A short term identity for a STA is an identity that can be easily changed while the STA is connected to an AP.

An AID can be assigned to a STA by an AP. The AID can be assigned to the STA after the STA associates with the AP. An AP can use an AID to indicate various information to a STA. For example, the AP can include an AID in a traffic information map (TIM) field of frame 400. In this case, frame 400 can be a beacon frame. The presence of the AID in the TIM field can indicate downlink frames are available for download at the AP by the corresponding STA. The AP can also include an AID in frame 400 to indicate a resource block allocation for the corresponding STA. In this case, frame 400 can be a trigger frame. The AP can also include an AID in a signal (SIG) field in frame 400 to indicate a resource block allocation for the corresponding STA.

Frame 400 can include a MAC header 404. MAC header 404 can include one or more identities for STAs. For example, MAC header 404 can include one or more MAC addresses for STAs. A MAC address can also be referred to as a long term identity for a STA. A long term identity for a STA is an identity that cannot be easily changed while the STA is connected to an AP or an ESS network the AP belongs to. A MAC address can be a globally unique MAC address or a locally administered MAC address.

A network interface of a STA (e.g., transceiver 220 of STA 200) is assigned a globally unique MAC address by the manufacturer of the network interface. The network interface of the STA can also be assigned a locally administered MAC address that overrides the globally unique MAC address. For example, a network administrator can assign a locally administered MAC address to the STA. A STA's locally administered MAC address can be changed.

An AP can use a STA's MAC address to manage the STA. For example, the AP can use the STA's MAC address to manage the STA's association with the AP. The AP can use the STA's MAC address to manage logical network address (e.g., an Internet Protocol (IP) address) assignment to the STA. The AP can use the STA's MAC address to perform Address Resolution Protocol (ARP) caching for the STA. The AP can use the STA's MAC address to manage roaming by the STA. The AP can use the STA's MAC address to manage various other characteristics associated with the STA as would be appreciated by a person of ordinary skill in the art.

In conventional approaches, frame 400 can store the MAC address of a STA in an unencrypted format (i.e. "in the clear"). As a result, a network sniffer can intercept frame 400 and determine the MAC address of the STA. This means that the STA can be easily tracked. To avoid being tracked, a STA can periodically change its MAC address to a random value. But this still does not protect the STA from being tracked. This is because the STA may be unable to change its MAC address once it joins a wireless network. The STA may not be able to change its MAC address once it joins the wireless network because changing it may prevent the AP from managing the STA's association with the AP. Therefore, once the STA joins the wireless network, the STA can often be easily tracked until the STA disconnects from the network.

Moreover, frame 400 can include various other fields ("fingerprint fields") that can be used to identity a STA. In conventional approaches, frame 400 can store these fields "in the clear" or unencrypted. As a result, a network sniffer can intercept frame 400 and monitor the values of these fields. This means that the STA can also be easily tracked using these fields.

For example, MAC header 404 can include various fields that can carry unique fingerprints for a STA. MAC header 404 can include receiver address (RA) 408, transmitter address (TA) 410, BSS Identifier (BSSID) 412, sequence control (SC) 414, high throughput control (HTC) 416, and Counter Mode Cipher Block Chaining Message Authentication Code Protocol (CCMP) 418. SC 414 can carry a frame 400's sequence number. The sequence number can be increased sequentially in following frames. HTC 416 can store various control settings. CCMP 418 can store a packet number (PN). The PN can be increased sequentially in following frames.

To solve these technological problems, embodiments herein establish a mapping between a short term identity for a STA (e.g., an AID) that is transmitted over a wireless network "in the clear" and periodically changed, and a long term identity for the STA (e.g., a MAC address) that remains constant while the STA is associated with an AP (or an ESS network the AP belongs to) and is never transmitted over the wireless network "in the clear." In addition, embodiments herein periodically change and or mask various "fingerprint" fields stored in frames transmitted over a wireless network.

The term "long term" in long term identity can refer to the fact that a long term identity of a STA is often changed less frequently than a short term identity of the STA. For example, a long term identity of a STA often cannot be changed after establishing an association with an AP.

Figure 5:
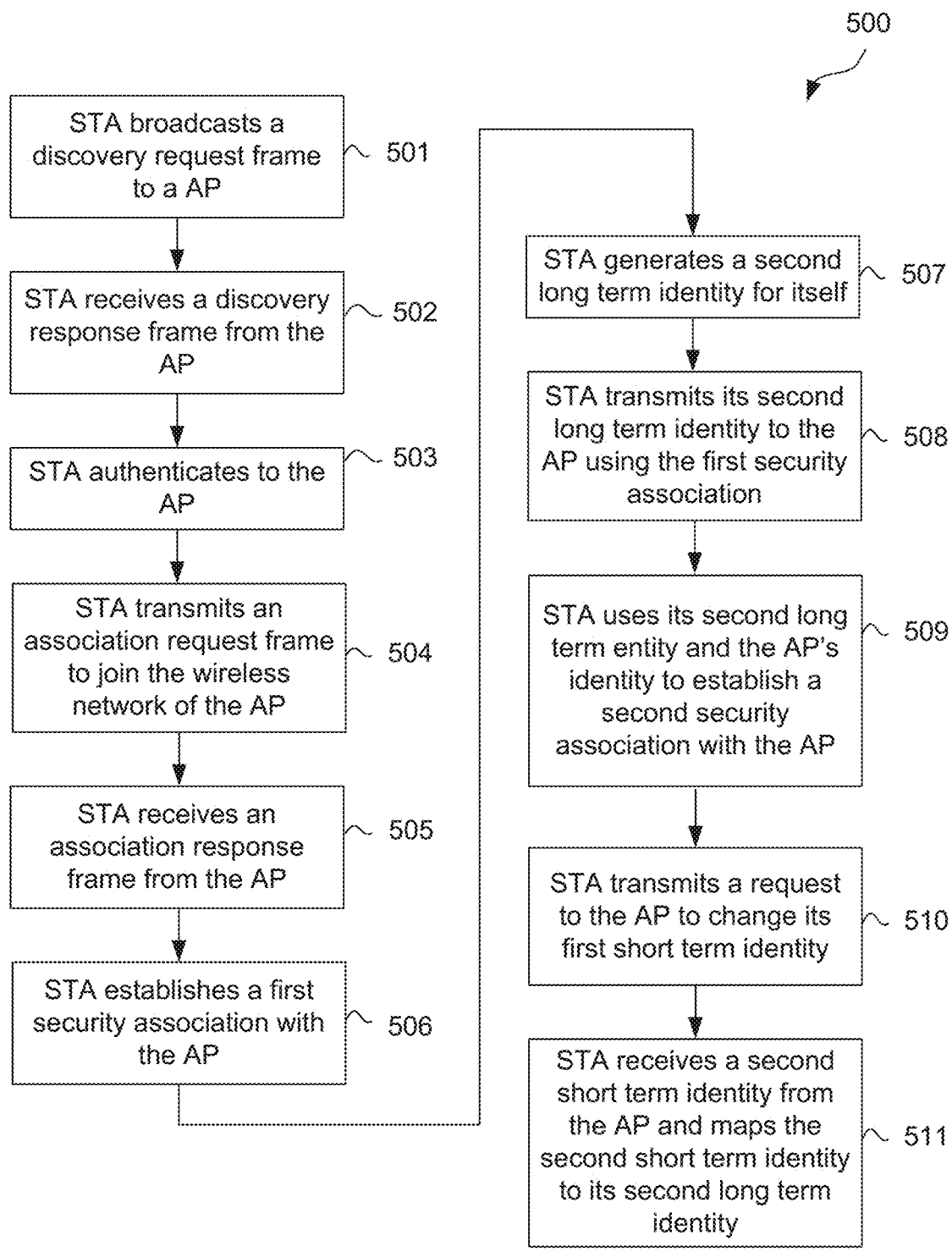
FIG. 5 is a flowchart of an example method for identity obscuration of a STA connected to a wireless network, according to some embodiments.

FIG. 5 is a flowchart of an example method 500 for identity obscuration of a STA connected to a wireless network, according to some embodiments. Method 500 can be performed by processing logic that can include hardware (e.g., circuitry, dedicated logic, programmable logic, microcode, etc.), software (e.g., instructions executing on a processing device), or a combination thereof. Method 500 can be used with various wireless communication protocols. It is to be appreciated that not all steps may be needed to perform the disclosure provided herein. Further, some of the steps may be performed simultaneously, or in a different order than shown in FIG. 5, as will be understood by a person of ordinary skill in the art. FIG. 5 is described with reference to FIGS. 1, 2, and 4.

In 501, a STA (e.g., STA 104) broadcasts a discovery request frame (e.g., a probe request frame) to discover available networks (e.g., an IEEE 802.11 network) within its proximity Prior to broadcasting the discovery request frame, the STA acquires a first long term identity (e.g., a locally administered MAC address). The STA can include its first long term identity in the discovery request frame.

The term "long term" in long term identity can refer to the fact that a long term identity of a STA is often changed less frequently than a short term identity of the STA. For example, a long term identity of a STA often cannot be changed after establishing an association with an AP.

The STA can generate its first long term identity by itself or be assigned its first long term identity by a user, network administrator, manufacturer, or other entity as would be appreciated by a person of ordinary skill in the art. The first long term identity can also be referred to as an original long term identity. The first long term identity can also be referred to as a pre-association long term identity. This is because the STA can be configured with the pre-association long term identity before it is joins a wireless network. The STA can change its first long term identity prior to 502. For example, the STA can change its first long term identity to a random value to avoid being tracked.

In 502, the STA receives a discovery response frame from an AP (e.g., AP 102) in response to the transmission of the discovery request frame.

In 503, the STA authenticates to the AP. This authentication process determines whether the STA can join a wireless network of the AP. As would be appreciated by a person ordinary skill in the art, the STA can authenticate to the AP using various types of authentication techniques. The STA can include its first long term identity in the one or more authentication frames used during the authentication process. However, once the authentication process starts, the STA cannot change its first long term identity until a security association is competed or aborted.

In 504, the STA transmits an association request frame to join the wireless network of the AP. The STA includes its first long term identity in the association request frame.

In 505, the STA receives an association response frame from the AP in response to the transmission of the association request frame. The association response frame can indicate whether the AP has allowed the STA to join its wireless network. If the AP has allowed the STA to join its wireless network, the association response frame can include a first short term identity for the STA (e.g., an AID). The AP can assign the first short term identity to the STA based on a random value. The STA's first short term identity can identify the STA in the wireless network of the AP. The STA then maps its first short term identity to its first long term identity, and stores the mapping in a memory, such as memory 240.

In 506, the STA establishes a first security association with the AP. The STA can use the first security association to encrypt frames to and from the AP. For example, the first security association can include a set of cryptographic keys that the STA can use to encrypt subsequent frames communicated to and from the AP. The STA can establish the first security association based on the STA's first long term identity and the AP's identity (e.g., the AP's MAC address).

In 507, the STA generates a second long term identity ("a new long term identity") for itself. The STA can generate its second long term identity based on a random value.

In 508, the STA transmits its second long term identity to the AP using the first security association. The STA's transmission of its second long term identity to the AP using the first security association prevents the second long term identity from being intercepted by a network sniffer.

In 509, the STA uses its second long term identity and the AP's identity to establish a second security association with the AP. The STA can use the second security association to encrypt frames to and from the AP after the first and second security associations are successfully established. For example, the second security association can include a set of cryptographic keys that the STA can use to encrypt frames to and from the AP.

In 510, the STA transmits a request to the AP to change its first short term identity. The STA can transmit the request to change its first short term identity to the AP using the second security association.

In 511, the STA receives a confirmation from the AP indicating that the STA's first short term identity has been changed to a second short term identity. The STA can receive the confirmation using the second security association. The STA then maps its assigned second short term identity to its second long term identity. The STA and the AP can include the STA's second short term identity and the AP's identity (e.g., BSSID) in frames to avoid exposing the STA's second long term identity to other devices. The STA can have its short term identity changed periodically, but keep its second long term identity unchanged, so that it can maintain the second security association with the AP, without changing cryptographic keys.

For example, the STA and the AP can include the STA's second short term identity and the AP's identity (e.g., BSSID) in frame 400 to avoid exposing the STA's second long term identity to other devices. If frame 400 is a downlink data or management frame, PHY header 402 can include the AP's identity (e.g., BSSID), the STA's second short term identity, a hash value of the STA's second short term identity, a hash value of the AP's identity, and or a hash value of the STA's second short term identity and the AP's identity. RA 408 can include the AP's identity, the STA's second short term identity, and or a hash value of the STA's second short term identity and the AP's identity. TA 410 can include the AP's identity, a null STA short term identity, and or a hash value of the null STA short term identity and the AP's identity. BSSID 412 can include the AP's identity.

If frame 400 is a uplink acknowledgment or block acknowledgement frame, RA 408 can include the AP's identity, a null STA short term identity, and or a hash value of the null STA short term identity and the AP's identity. TA 410 can include the AP's identity, the STA's second short term identity, and or a hash value of the STA's second short term identity and the AP's identity.

If frame 400 is a uplink data or management frame, PHY header 402 can include the AP's identity, a null STA short term identity, and or a hash value of the null STA short term identity and the AP's identity. RA 408 can include the AP's identity, a null STA short term identity, and or a hash value of the null STA short term identity and the AP's identity. TA 410 can include the AP's identity, the STA's second short term identity, and or a hash value of the STA's second short term identity and the AP's identity. BSSID 412 can include the AP's identity.

If frame 400 is a downlink acknowledgment or block acknowledgement frame, RA 408 can include the AP's identity, the STA's second short term identity, and or a hash value of the STA's second short term identity and the AP's identity. TA 410 can include the AP's identity, a null STA short term identity, and or a hash value of the null STA short term identity and the AP's identity.

Figure 6:
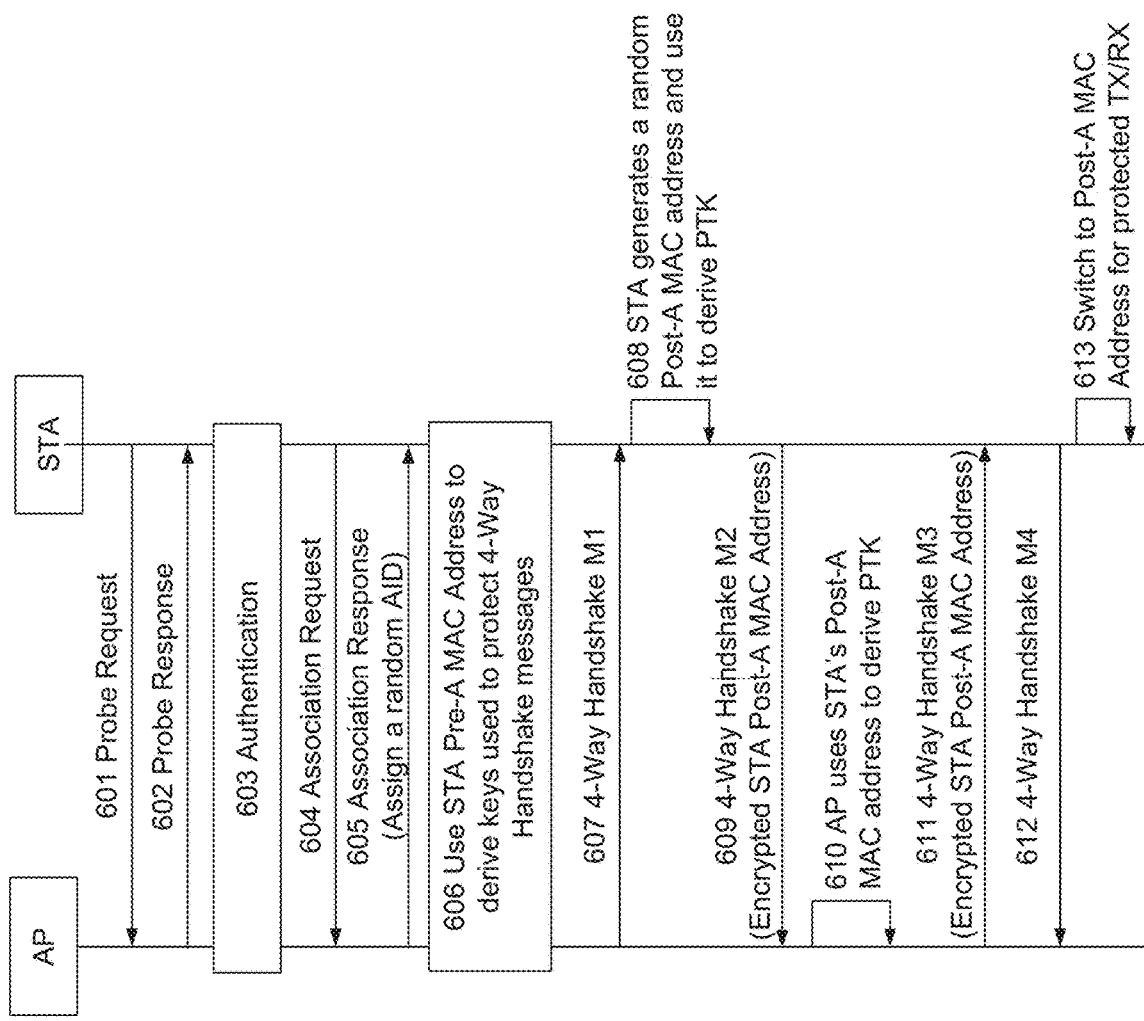
FIG. 6 is a swim lane diagram illustrating identity obscuration of a STA connected to a IEEE 802.11 wireless network, according to some embodiments.

FIG. 6 is a swim lane diagram illustrating identity obscuration of a STA connected to a IEEE 802.11 wireless network, according to some embodiments, according to some embodiments. FIG. 6 is discussed with reference to FIG. 1.

In 601, a STA (e.g., STA 104) can transmit a probe request frame to an AP (e.g., AP 102) to discover wireless networks (e.g., BSSs) within its proximity. The probe request frame can advertise the STAs supported data rates and capabilities (e.g., IEEE 802.11ax capable). Prior to transmitting the probe request frame to the AP, the STA acquires a first MAC address and includes the first MAC address in the probe request frame. The STA can generate the first MAC address by itself, or be assigned the first MAC address by a user, network administrator, manufacturer, or other entity as would be appreciated by a person of ordinary skill in the art. The first MAC address can also be referred to as a pre-association MAC address. This is because the STA can acquire pre-association MAC address before it is joins a wireless network. The STA can change its first MAC address until 602. For example, the STA can change its first MAC address to a random value.

In 602, the AP can transmit a probe response frame to the STA in response to receiving the probe request frame. The AP can transmit the probe response frame to the STA if the STA is network compatible with the AP. The probe response frame can include a service set identifier (SSID) of a BSS for the AP. The probe response frame can include one or more supported data rates, one or more supported encryption types, and various other capabilities of the AP as would be appreciated by a person of ordinary skill in the art.

In 603, the STA can authenticate to the AP. For example, the STA can perform IEEE 802.11 authentication such as Open System Authentication or Shared Key Authentication. In Open System Authentication, the STA can authenticate itself to the AP using its first MAC address. For example, the STA can transmit an IEEE 802.11 authentication management frame that contains its first MAC address to the AP. The AP can then check the STA's first MAC address and transmit back an authentication verification frame. After completing 603, the STA is authenticated to the AP but not yet associated with the AP. Once the authentication process starts, the STA cannot change its first MAC address until a security association is completed or aborted.

In 604, the STA can transmit an association request frame to the AP. The STA can transmit the association request frame to the AP when it determines that it wants to associate with the AP. The STA can include its first MAC address in the association request frame. The association request frame can include the STA's supported data rates, supported encryption types, and various other capabilities of the STA as would be appreciated by a person of ordinary skill in the art.

In 605, the AP can transmit an association response frame to the STA in response to receiving the association request frame. The AP can indicate in the association response frame whether the AP has allowed the STA to join its BSS. The AP can allow the STA to join its BSS if the STA's capabilities specified in the association request frame match the capabilities of the AP. If the AP accepts the association request from the STA, the AP can assign a random association identifier (AID) to the STA. The AP can include the assigned AID in the association response frame. This AID can be referred to as a first short term identifier or an original short term identifier.

In 606, the STA can derive a first set of cryptographic keys based on its first MAC address and the AP's MAC address. Similarly, the AP can derive the same one or more cryptographic keys based on the STA's first MAC address and the AP's MAC address. The first set of cryptographic keys can include an Extensible Authentication Protocol over LAN Key Confirmation Key (EAPOL-KCK) and an EAPOL Key Encryption Key (EAPOL-KEK). The first set of cryptographic keys can be a part of a first security association between the STA and the AP. The STA can use the first security association to encrypt frames to and from the AP. For example, the STA can encrypt the frames of a 4-way handshake between the STA and the AP. The 4-way handshake can be based on the IEEE 802.11i standard.

In 607, the AP can transmit a first frame in the 4-way handshake to the STA. The first frame can include a nonce-value (e.g., an ANonce) and a Key Replay Counter. The Key Replay Counter can be a number that is used to match each pair of frames being sent.

In 608, the STA can generate a random second MAC address in response to receiving the first frame of the 4-way handshake from the AP. The second MAC address can also be referred to as a post-association MAC address. This is because the STA can use the post-association MAC address after it joins the wireless network. The STA can start to use the second MAC address after the 4-way handshake is completed.

The STA can further derive a second set of cryptographic keys based on the second MAC address and the AP's MAC address. The second set of cryptographic keys can be a part of a second security association between the STA and the AP. The STA can use the second security association to encrypt frames to and from the AP after the 4-way handshake is completed and the STA is associated with the AP.

In 609, the STA can securely transmit a second frame in the 4-way handshake to the AP using the first set of cryptographic keys. The second frame can include the second MAC address. The second frame can include the second MAC address in its Key Data field, which is encrypted based on the first set of cryptographic keys. In other words, the AP can transmit the second frame to the AP in encrypted form.

In 610, the AP can derive the second set of cryptographic keys of 608 based on the second MAC address stored in the second frame in the 4-way handshake and the AP's MAC address.

In 611, the AP can securely transmit a third frame in the 4-way handshake to the STA using the first set of cryptographic keys. The AP can indicate in the third frame whether the AP has accepted the STA's choice to assign itself the second MAC address. If the AP determines the second MAC address is already being used by another STA, the AP can terminate the 4-way handshake by including an error code in the third frame (e.g., "Duplicate MAC address"). On the other hand, if the AP determines the second MAC address does not conflict with a MAC address of another STA, the AP can confirm there is no conflict by including the second MAC address in the third frame. The third frame can include the second MAC address in its Key Data field, which is encrypted based on the first set of cryptographic keys.

In 612, the STA can securely transmit a fourth frame in the 4-way handshake to the AP using the first set of cryptographic keys. The STA can indicate in the fourth frame whether the STA has confirmed that the third frame in the 4-way handshake is valid, and therefore complete the 4-way handshake.

In 613, the STA can assign itself (or switch to) the second MAC address in response to completing the 4-way handshake. The AP and the STA can further map the STA's AID assigned in 605 to the STA's second MAC address. The STA can further use the second set of cryptographic keys to securely exchange frames with the AP going forward. The STA and the AP can include the STA's AID and the AP's identity (e.g., BSSID) in the frames to avoid exposing the STA's second MAC address to other devices. The STA can have its AID changed periodically, but keep its second MAC address unchanged, so that it can maintain the second security association with the AP, without changing cryptographic keys.

For example, the STA and the AP can include the STA's AID and the AP's identity in frame 400 to avoid exposing the STA's second MAC address to other devices. If frame 400 is a downlink data or management frame, PHY header 402 can include the AP's identity (e.g., BSSID), the STA's AID, a hash value of the STA's AID, a hash value of the AP's identity, and or a hash value of the STA's AID and the AP's identity. RA 408 can include the AP's identity, the STA's AID, and or a hash value of the STA's AID and the AP's identity. TA 410 can include the AP's identity, a STA AID of 0, and or a hash value of the STA AID of 0 and the AP's identity. BSSID 412 can include the AP's.

For example, if frame 400 is a uplink acknowledgment or block acknowledgement frame, RA 408 can include the AP's identity, a STA AID of 0, and or a hash value of the STA AID of 0 and the AP's identity. TA 410 can include the AP's identity, the STA's AID, and or a hash value of the STA's AID and the AP's identity.

If frame 400 is a uplink data or management frame, PHY header 402 can include the AP's identity, a STA AID of 0, and or a hash value of the STA AID of 0 and the AP's identity. RA 408 can include the AP's identity, a STA AID of 0, and or a hash value of the STA AID of 0 and the AP's identity. TA 410 can include the AP's identity, the STA's AID, and or a hash value of the STA's AID and the AP's identity. BSSID 412 can include the AP's identity.

If frame 400 is a downlink acknowledgment or block acknowledgement frame, RA 408 can include the AP's identity, the STA's AID, and or a hash value of the STA's AID and the AP's identity. TA 410 can include AP's identity, a STA AID of 0, and or a hash value of the STA AID of 0 and the AP's identity.

After the STA assigns itself the second MAC address (e.g., a new long term identifier) and associates itself with the AP, the STA can request the AP to change its assigned AID (e.g., its original short term identifier). Periodically changing the STA's assigned AID can reduce the chance that a network sniffer can track the STA based on its assigned AID. This is because the assigned AID can be transmitted "in the clear."

The STA can change its assigned AID using AID Change Request, AID Change Response, and/or AID Update frames. AID Change Request, AID Change Response, and AID Update frames can be robust management frames, which are encrypted by the second set of cryptographic keys. AID Change Request, AID Change Response, and AID Update frames can also be Extensible Authentication Protocol (EAP) frames, which are encrypted by the second set of cryptographic keys.

In some embodiments, after the STA assigns itself the second MAC address and associates itself with the AP, the STA can transmit an AID Change Request frame to the AP with a desired AID change period. An AID change period can indicate how often the AP will assign a new AID (e.g., a new short term identifier) to the STA via an AID Update frame. The AID change period can also be referred to as a short term identity change period.

In response to receiving the AID Change Request frame, the AP can transmit back an AID Change Response frame with a confirmed AID change period. The confirmed AID change period can be different than the desired AID change period. The AP can then transmit an AID Update frame to the STA with the STA's new AID. The STA can then use the new AID going forward. Both the AP and the STA can also map the STA's new AID to its second MAC address.

In some other embodiments, after the STA assigns itself the second MAC address and associates itself with the AP, the STA can transmit an on-demand AID Change Request frame to the AP. The AP can transmit back an AID Update frame to the STA with its new AID. The STA can then use the new AID going forward. Both the AP and the STA can also map the STA's new AID to its second MAC address.

After being assigned a new AID, the STA can maintain its second MAC address and continue to use the second set of cryptographic keys to securely exchange frames with the AP.

Both the AP and the STA can include the STA's new AID and the AP's identity in the transmitted frames.

Whether the STA gets assigned its new AID periodically or on-demand, it is preferable that the AP assign an unpredictable new AID to the STA to prevent a network sniffer from tracking the STA based on changes to its AID. But it is also preferable for the AP to assign continuous AIDs to multiple STAs. This is because assigning continuous AIDs to STAs reduces a size of a traffic information map (TIM) field in a beacon frame broadcast by the AP.

The TIM field in a beacon frame can specify buffered frames available at the AP for download by STAs. The TIM field can use a bitmap to specify buffered frames available at the AP for download by associated STAs. Each bit in the bitmap can represent an AID potentially assigned to a STA. The bitmap can be 2008 bits.

Because of the large size of the bitmap, the entire bitmap is often never transmitted in its entirety in a beacon frame. Rather, the TIM field can use a partial virtual bitmap. The partial virtual bitmap can represent a continuous portion of the bitmap space containing AIDs that point to all STAs which have buffered frames at the AP. The TIM field includes an offset indicating where the partial virtual bitmap begins in the larger bitmap. This can reduce the size of the TIM field which can reduce decoding time, medium contention, and power usage at the associated STAs.

FIG. 7 is a block diagram of an example TIM bitmap 702 of a TIM field that is represented using a partial virtual bitmap 706, according to some embodiments. TIM bitmap 702 can represent a range of AIDs 704 available for assignment to STAs by an AP. This range of AIDs 704 can also be referred to as an AID space or a short term identity space.

In FIG. 7, TIM bitmap 702 includes 2008 bits. Each bit in TIM bitmap 702 can correspond to an AID 704. A 1 bit can indicate that buffered frames are available for download at the AP by the corresponding STA. A 0 bit can indicate that no frames are available for download at the AP by the corresponding STA. Thus, because TIM bitmap 702 includes 2008 bits, TIM bitmap 702 can specify whether buffered frames are available at the AP for download by up to 2008 STAs (e.g., AID 0 to AID 2007).

But often the AP has a small number of STAs connected to it. To reduce the size of TIM bitmap 702, the AP can assign AIDs to STAs from a continuous portion of the range of AIDs 704 in TIM bitmap 702. Because AIDs outside this continuous portion are not assigned to STAs, they do not need to be represented in the TIM field. Rather, the continuous portion can be represented as partial virtual bitmap 706 together with an offset (e.g., n). The offset can indicate where partial virtual bitmap 706 begins in TIM bitmap 702. The AP can include partial virtual bitmap 706 and its associated offset in the TIM field in a beacon frame.

But in some embodiments, it is also preferable for an AP to assign an unpredictable new AID to a STA to prevent a network sniffer from tracking the STA based on changes to its AID. To enable the AP to select an unpredictable new AID for a STA while maintaining a reduction in the size of TIM bitmap 702, the AP can select a new AID for a STA using a block based strategy.

In some embodiments involving this block based strategy, the AP can estimate the maximum number of STAs associated with the AP (e.g., m STAs). For example, the AP can estimate the maximum number of STAs associated with the AP based on the number of STAs that have joined the AP in a period of time. The AP can then divide the whole AID space (e.g., AID 0 to AID 2007) into a number of AID blocks (e.g., s blocks). Each block can contain m AIDs.

When a new AID change period starts, the AP can select a random AID block from the s AID blocks. The AP can then assign and or reassign AIDs randomly within the selected AID block until the end of the AID change period. In other words, the AP can assign and or reassign AIDs within the selected block based a random value. This approach can ensure that AIDs are assigned to STAs unpredictability while still enabling TIM bitmap 702 to be represented at reduced size using partial virtual bitmap 706.

During assignment and or reassignment of AIDs, the AP can check that old AIDs do not conflict with new AIDs between two adjacent AID change periods. The AP can also simultaneously serve STAs that support AID changing and STAs that do not support AID changing. The AP can do this by keeping an original TIM bitmap for STAs that do not support AID change, and one or more new TIM bitmaps for STAs that support AID changing.

In addition to including one or more identities for a STA in a frame, the frame can often include various other fields ("fingerprint fields") that can be used to identity the STA. For example, frame 400 of FIG. 4 can include various fields that can be used to identity a STA such as, but not limited to, SC 414, HTC 416, and CCMP 418. In conventional approaches, frame 400 can store these fields "in the clear" or unencrypted. As a result, a network sniffer can intercept frame 400 and determine the values of these fields. This means that the STA can often be easily tracked using these fields.

To solve this technological problem, in some embodiments, a STA can periodically change or mask various "fingerprint" fields stored in frames transmitted over a wireless network to prevent a network sniffer from tracking the STA using these fields. For example, the STA can reset the SC field (e.g., SC 414) in a frame to a random value whenever the STA has its AID (e.g., short term identity) changed.

The STA can also reset the packet number (PN) of a CCMP field (e.g., CCMP 418) in a frame to a random value whenever the STA has its AID (e.g., short term identity) changed. To avoid the PN expiring quickly, the STA can reset the PN to a random value within a first subspace of its entire sequence space. In this case, the first m most significant bits (MSB) are set to zero. To reset the PN, the STA can also establish a new set of cryptographic keys (e.g., a PTK) with the AP.

The STA can also mask a HTC field (e.g., HTC 416) and or a CCMP field (e.g., CCMP 418) in a frame. This can enable the STA to avoid having to change the real values of these fields. To mask these fields, the STA can calculate a mask and apply the mask to the fields. The STA can apply the mask to the fields using a bitwise XOR operation. As would be appreciated by a person of ordinary skill in the art, the STA can apply the mask to the fields using various other techniques.

The STA can use a set of cryptographic keys to calculate the mask. The set of cryptographic keys can be generated as part of establishing a security association between the STA and the AP. For example, the STA can use the second set of cryptographic keys in step 607 of FIG. 6. In other words, the STA can use the set of cryptographic keys established for use post STA association with the AP.

The STA can calculate the mask by applying a cryptographic hash function to a key_mask from the set of cryptographic keys, the BSS identifier of the AP, and the AID of the STA. The STA can change the mask whenever a new AID is assigned to the STA. As would be appreciated by a person of ordinary skill in the art, the STA can calculate the mask using various types of cryptographic hash functions such as, but not limited to, SipHash, Secure Hash Algorithm (SHA)-1, SHA-2, or SHA-3.

The STA can also calculate the mask by applying a cryptographic hash function to a key_mask from the set of cryptographic keys, the BSS identifier of the AP, the AID of the STA, and the value of a SC field (e.g., SC 414 in FIG. 4). In this case, the STA can change the mask for every frame transmitted. The STA can also reset the SC field to a random value when a new AID is assigned to the STA.

The STA can also encrypt one or more MAC header fields of a frame together with the MAC payload. For example, the STA can encrypt MAC header fields 408-416 together with MAC payload 406 of frame 400.

The STA can encrypt this data using a set of cryptographic keys. The set of cryptographic keys can be generated as part of establishing a security association between the STA and the AP. For example, the STA can use the second set of cryptographic keys in step 607 of FIG. 6. In other words, the STA can use the set of cryptographic keys established for use post STA association with the AP.

However, to encrypt this data, the STA may need to move one or more MAC header fields before the encrypted data. For example, the STA may need to move the CCMP field before the encrypted data (e.g., CCMP 418 in frame 400).

Figure 8:
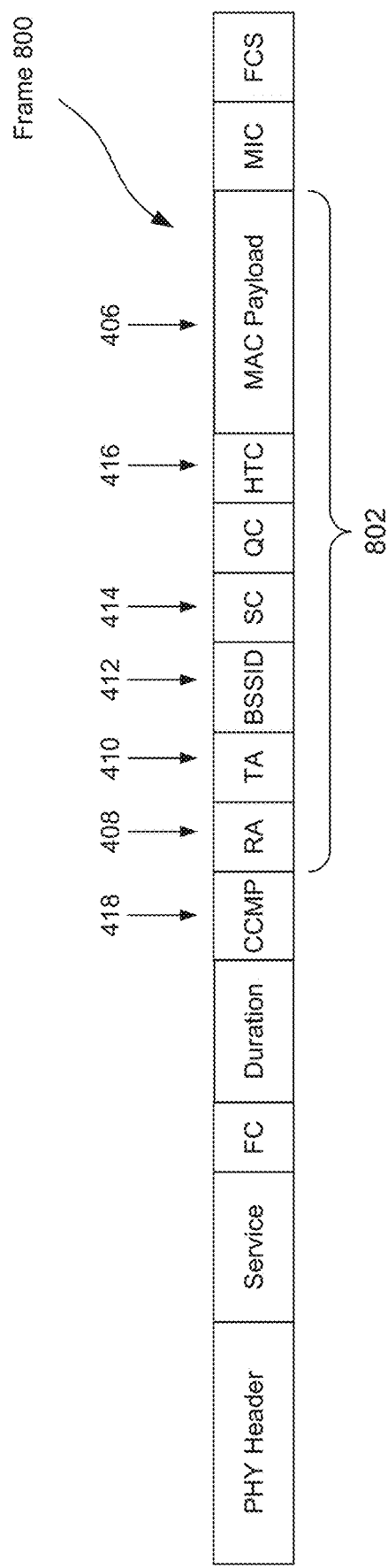
FIG. 8 is a block diagram of an example standard compliant frame in which a Counter Mode Cipher Block Chaining Message Authentication Code Protocol (CCMP) field has been moved as part of encrypting one or more MAC header fields together with a MAC payload, according to some embodiments.

FIG. 8 is a block diagram of an example standard compliant frame 800 in which a CCMP field has been moved as part of encrypting one or more MAC header fields together with a MAC payload, according to some embodiments. In FIG. 8, the STA encrypts RA 408, TA 410, BSSID 412, SC 414, and HTC 416 together with MAC payload 406 of frame 400 to produce encrypted data 802. The STA then moves CCMP 418 of frame 400 before encrypted data 802. The result is frame 800.

The STA can encrypt RA 408, TA 410, BSSID 412, SC 414, and HTC 416 together with MAC payload 406 using a set of cryptographic keys. The set of cryptographic keys can be generated as part of establishing a security association between the STA and the AP. For example, the STA can use the second set of cryptographic keys in step 607 of FIG. 6. In other words, the STA can use the set of cryptographic keys established for use post STA association with the AP.

The STA can also reset the PN of CCMP 418 in frame 800 to a random value whenever the STA has its AID (or short term identity) changed. The STA can also mask the CCMP 418 in frame 800.

Various embodiments can be implemented, for example, using systems, such as STA 200 and AP 300. STA 200 can be used, for example, to implement method 500 and the swim lane of FIG. 6. AP 300 can be used, for example, to implement the swim lane of FIG. 6.

Figure 9:
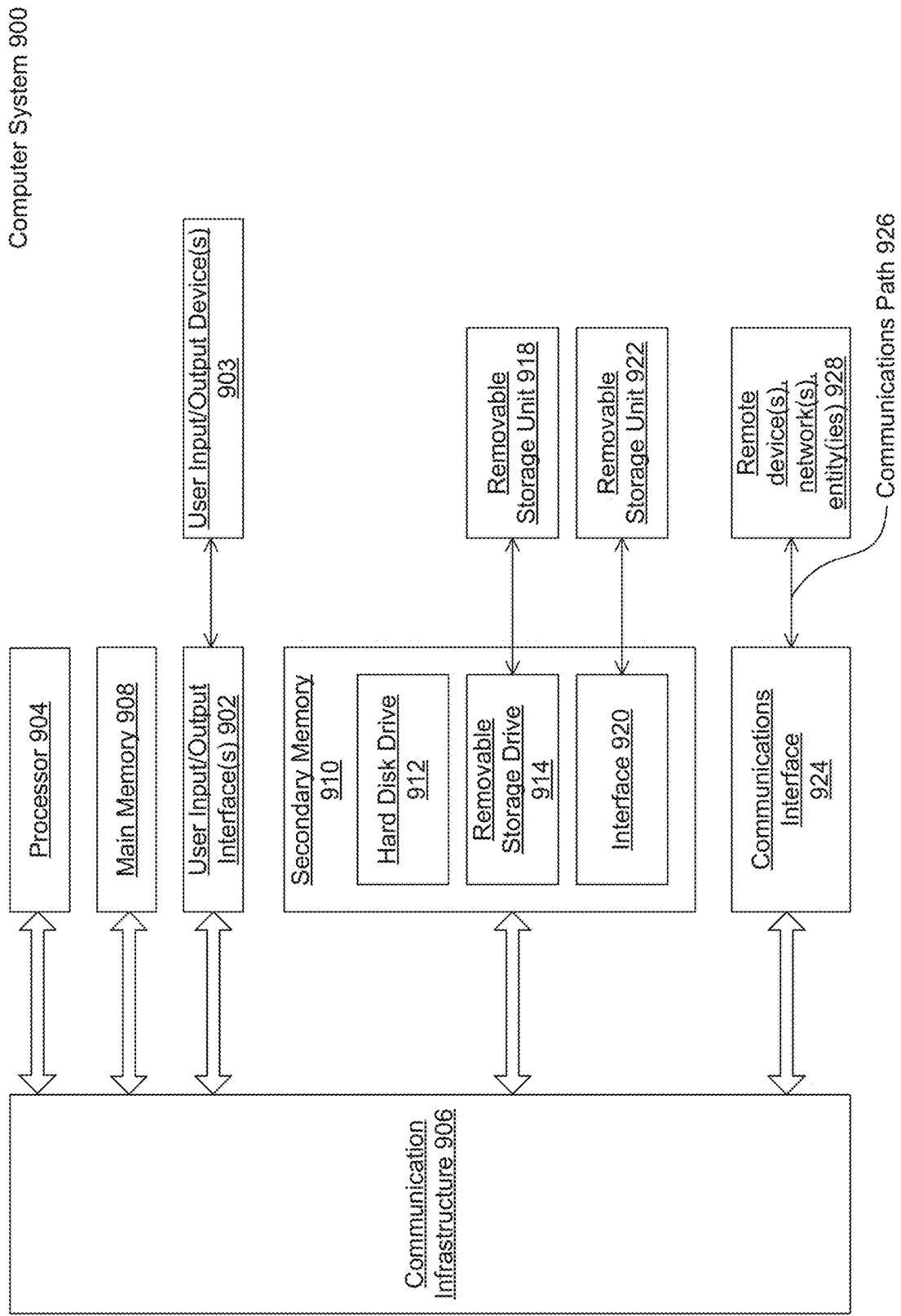
FIG. 9 is an example computer system for implementing various embodiments.

Various embodiments can also be implemented, for example, using one or more computer systems, such as computer system 900 shown in FIG. 9. Computer system 900 can be used, for example, to implement method 500 and the swim lane of FIG. 6. Computer system 900 can be any computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In embodiments, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to embodiments, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Communication interface 924 can also be referred to as a transceiver. Control logic and/or data may be transmitted to and from computer system 900 via communication path 926.

In embodiments, a tangible apparatus or article of manufacture including a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 9. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A station, comprising:
   a transceiver; and
   at least one processor communicatively coupled to the transceiver, wherein the at least one processor is configured to:
   establish, using the transceiver, a first security association with an access point (AP) based at least in part on an original long term identity for the station, wherein the first security association uses a first set of cryptographic keys;
   generate a new long term identity for the station;
   establish, using the first security association, a second security association with the AP based at least in part on the new long term identity for the station and an identity of the AP, wherein the second security association uses a second set of cryptographic keys that is different from the first set of cryptographic keys;
   transmit, using the second security association, a request frame to the AP to change an original short term identity assigned to the station;
   receive, using the second security association, a response frame from the AP that comprises a new short term identity assigned to the station by the AP; and
   map the new short term identity for the station to the new long term identity assigned to the station by the AP.

2. The station of claim 1, wherein the station operates according to an Institute of Electrical and Electronics Engineers (IEEE) 802.11 standard, the new short term identity comprises an association identifier (AID) assigned by the AP, and the new long term identity comprises a media access control (MAC) address.

3. The station of claim 1, wherein the at least one processor is further configured to:
   receive, using the transceiver, an association response frame from the AP that comprises the original short term identity assigned to the station.

4. The station of claim 1, wherein the at least one processor is further configured to:
   encrypt the new long term identity using an encryption key in the first set of cryptographic keys; and
   transmit, using the transceiver, the encrypted new long term identity to the AP.

5. The station of claim 1, wherein the at least one processor is further configured to:
   set at least one of a sequence control (SC) field or a packet number (PN) field in a Counter Mode Cipher Block Chaining Message Authentication Code Protocol (CCMP) field in a frame to a random value in response to the new short term identity being assigned to the station.

6. The station of claim 1, wherein the at least one processor is further configured to:
   mask at least one of a High Throughput Control (HTC) field or a Counter Mode Cipher Block Chaining Message Authentication Code Protocol (CCMP) field in a frame in response to the new short term identity being assigned to the station.

7. The station of claim 1, wherein to receive the response frame from the AP the at least one processor is further configured to:
   receive, using the second security association, the response frame from the AP based at least in part on a short term identity change period.

8. The station of claim 1, wherein the at least one processor is further configured to:
   transmit a frame to the AP, wherein the frame comprises first data representing the new short term identity for the station and second data representing the identity of the AP, and the frame excludes the new long term identity.

9. A method for hiding an identity of a station in a wireless network, comprising:
   establishing, using a transceiver, a first security association with an access point (AP) based at least in part on an original long term identity for the station, wherein the first security association uses a first set of cryptographic keys;
   generating, by at least one processor, a new long term identity for the station;
   establishing, using the first security association, a second security association with the AP based at least in part on the new long term identity for the station and an identity of the AP, wherein the second security association uses a second set of cryptographic keys that is different from the first set of cryptographic keys;
   transmitting, using the second security association, a request frame to the AP to change an original short term identity assigned to the station;
   receiving, using the second security association, a response frame from the AP that comprises a new short term identity assigned to the station by the AP; and
   mapping, by the at least one processor, the new short term identity for the station to the new long term identity assigned to the station by the AP.

10. The method of claim 9, wherein the station operates according to an Institute of Electrical and Electronics Engineers (IEEE) 802.11 standard, the new short term identity comprises an association identifier (AID) assigned by the AP, and the new long term identity comprises a media access control (MAC) address.

11. The method of claim 9, wherein the generating the new long term identity for the station further comprises:
    generating, by the at least one processor, the new long term identity for the station based at least in a part on a random value.

12. The method of claim 9, further comprising:
    encrypting, by the at least one processor, the new long term identity using an encryption key in the first set of cryptographic keys; and
    transmitting, using the transceiver, the encrypted new long term identity to the AP.

13. The method of claim 9, further comprising:
    setting, by the at least one processor, at least one of a sequence control (SC) field or a packet number (PN) field in a Counter Mode Cipher Block Chaining Message Authentication Code Protocol (CCMP) field in a frame to a random value in response to the new short term identity being assigned to the station.

14. The method of claim 9, further comprising:
    masking, by the at least one processor, at least one of a High Throughput Control (HTC) field or a Counter Mode Cipher Block Chaining Message Authentication Code Protocol (CCMP) field in a frame in response to the new short term identity being assigned to the station.

15. An access point (AP), comprising:
a transceiver; and
at least one processor communicatively coupled to the transceiver, wherein the at least one processor is configured to:
  establish, using the transceiver, a first security association with a station based at least in part on an original long term identity for the station, wherein the first security association uses a first set of cryptographic keys;
  receive, using the first security association, a new long term identity for the station from the station;
  establish, using the first security association, a second security association with the station based at least in part on the new long term identity for the station and an identity of the AP, wherein the second security association uses a second set of cryptographic keys that is different from the first set of cryptographic keys;
  receive, using the second security association, a request frame from the station to change an original short term identity assigned to the station by the AP;
  transmit, using the second security association, a response frame to the station that comprises a new short term identity assigned to the station by the AP; and
  map the new short term identity for the station to the new long term identity assigned to the station by the AP.

16. The AP of claim 15, wherein the AP operates according an Institute of Electrical and Electronics Engineers (IEEE) 802.11 standard, the new short term identity comprises an association identifier (AID) assigned to the station by the AP, and the new long term identity comprises a media access control (MAC) address.

17. The AP of claim 15, wherein the at least one processor is further configured to:
  transmit, using the transceiver, an association response frame to the station that comprises the original short term identity assigned to the station by the AP.

18. The AP of claim 15, wherein the at least one processor is further configured to:
  decrypt the new long term identity for the station using a decryption key in the first set of cryptographic keys.

19. The AP of claim 15, wherein to transmit the response frame to the station the at least one processor is further configured to:
  transmit, using the second security association, the response frame to the station based at least in part on a short term identity change period.

20. The AP of claim 15, wherein the at least one processor is further configured to:
  determine a maximum number of stations associated with the AP;
  partition a short term identity space into a set of blocks;
  select a block in the set of blocks based at least in part on a random value; and
  select the new short term identity for the station from the selected block in response to receiving the request frame from the station to change the original short term identity assigned to the station.

* * * * *